US012661836B2

(12) United States Patent
Teramoto et al.

(10) Patent No.: US 12,661,836 B2
(45) Date of Patent: Jun. 23, 2026

(54) MAINTENANCE METHOD FOR DISCHARGE UNIT

(71) Applicant: SEIKO EPSON CORPORATION, Tokyo (JP)

(72) Inventors: Tatsuya Teramoto, Shiojiri (JP); Taki Hashimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 72 days.

(21) Appl. No.: 18/930,412

(22) Filed: Oct. 29, 2024

(65) Prior Publication Data

US 2025/0135694 A1      May 1, 2025

(30) Foreign Application Priority Data

Oct. 31, 2023    (JP) ................................. 2023-186656

(51) Int. Cl.
| | |
|---|---|
| *B29C 64/106* | (2017.01) |
| *B29C 45/17* | (2006.01) |
| *B29C 45/47* | (2006.01) |
| *B29C 45/74* | (2006.01) |

(52) U.S. Cl.
CPC .......... *B29C 45/1753* (2013.01); *B29C 45/47* (2013.01); *B29C 45/74* (2013.01); *B29C 2945/76006* (2013.01); *B29C 2945/7618* (2013.01); *B29C 2945/76545* (2013.01)

(58) Field of Classification Search
CPC  A21C 11/16; A21C 3/04; B28B 21/52; B28B 3/2636; B22F 3/20; B30B 11/201
See application file for complete search history.

(56) References Cited

U.S. PATENT DOCUMENTS

2005/0178407 A1*  8/2005  Gandelheidt ............. B08B 9/00
                                                      425/326.1
2024/0367363 A1*  11/2024  Dehlinger ............... B29B 7/582

FOREIGN PATENT DOCUMENTS

| CN | 114769221 A | * | 7/2022 | ........... F27D 1/1808 |
|---|---|---|---|---|
| JP | 53043752 A | * | 4/1978 | |
| JP | 2015-063099 | | 4/2015 | |

* cited by examiner

*Primary Examiner* — Yung-Sheng M Tsui
(74) *Attorney, Agent, or Firm* — WORKMAN NYDEGGER

(57) ABSTRACT

Provided is a maintenance method for a discharge unit which has a nozzle hole and plasticizes a material containing a thermoplastic resin to generate a plasticized material. This maintenance method includes a heating step of heating a material or a plasticized material present in a flow path which communicates with a nozzle hole and through which the material or the plasticized material passes at a temperature equal to or higher than the thermal decomposition temperature of the material or the plasticized material, and a releasing step of releasing the material or the plasticized material thermally decomposed in the heating step from the flow path.

9 Claims, 6 Drawing Sheets

MAINTENANCE METHOD FOR DISCHARGE UNIT

The present application is based on, and claims priority from JP Application Serial Number 2023-186656, filed Oct. 31, 2023, the disclosure of which is hereby incorporated by reference herein in its entirety.

BACKGROUND

1. Technical Field

The present disclosure relates to a maintenance method for a discharge unit.

2. Related Art

JP-A-2015-63099 discloses that, in a three-dimensional shaping apparatus, when a resin material extruded from a nozzle is switched to a different resin material, the resin material remaining in the nozzle is removed.

There is a demand for a technique capable of quickly removing a material in a discharge unit provided in a three-dimensional shaping apparatus when performing maintenance work such as replacement of the material or cleaning of the apparatus in the three-dimensional shaping apparatus. Such a problem is not limited to the discharge unit provided in the three-dimensional shaping apparatus, but is a problem common to discharge units that discharge materials, such as a discharge unit provided in an injection molding machine.

SUMMARY

According to a first aspect of the present disclosure, there is provided a maintenance method for a discharge unit which has a nozzle hole and plasticizes a material containing a thermoplastic resin to generate a plasticized material. The maintenance method includes a heating step of heating the material or the plasticized material present in the flow path which communicates with the nozzle hole and through which the material or the plasticized material passes at a temperature equal to or higher than the thermal decomposition temperature of the material or the plasticized material, and a releasing step of releasing the material or the plasticized material thermally decomposed in the heating step from the flow path.

DESCRIPTION OF EMBODIMENTS

A. First Embodiment

Figure 1:
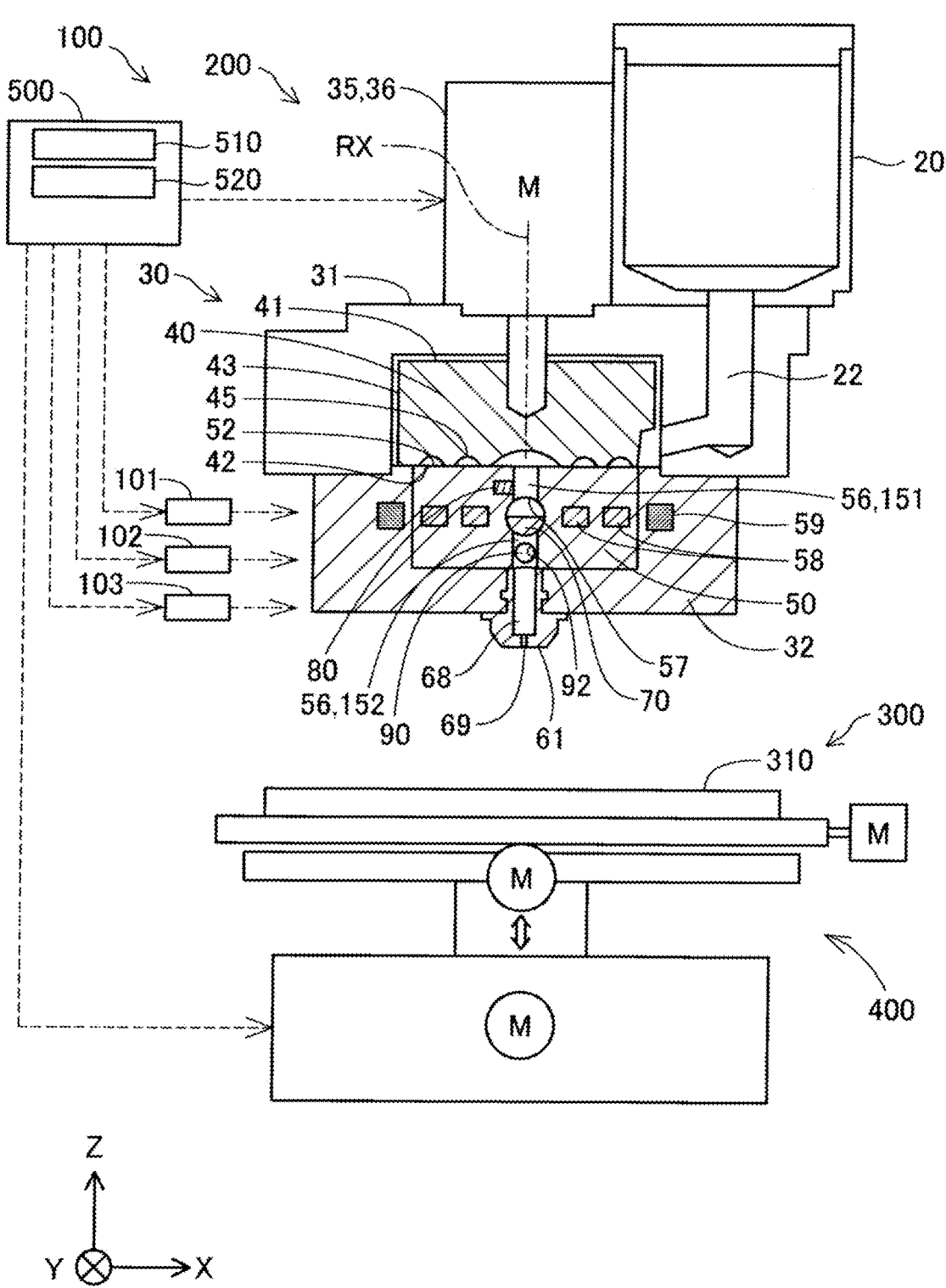
FIG. 1 is an illustrative diagram illustrating the schematic configuration of a three-dimensional shaping apparatus according to the first embodiment.

FIG. 1 is an illustrative diagram illustrating the schematic configuration of a three-dimensional shaping apparatus 100 according to the first embodiment. FIG. 1 illustrates arrows along the X, Y, and Z directions orthogonal to each other. The X direction and the Y direction are directions along the horizontal direction, and the Z direction is a direction along the vertical direction. In other drawings, arrows along the X, Y, and Z directions are appropriately represented. The X, Y, and Z directions in FIG. 1 and the X, Y, and Z directions in the other drawings represent the same directions.

The three-dimensional shaping apparatus 100 according to the present embodiment includes a discharge unit 200, a stage 300, a moving mechanism 400, and a control unit 500. Under the control of the control unit 500, the three-dimensional shaping apparatus 100 drives the moving mechanism 400 to change the relative position between the nozzle 61 and the shaping surface 310 while discharging a plasticized material from a nozzle hole 69 of a nozzle 61 provided in the discharge unit 200 toward a shaping surface 310 of the stage 300, thereby shaping a three-dimensional shaped object having plasticized material layers laminated on the shaping surface 310. The detailed configuration of the discharge unit 200 will be described later.

As described above, the moving mechanism 400 changes the relative position between the nozzle 61 and the shaping surface 310. In the present embodiment, the moving mechanism 400 supports the stage 300 and changes the relative position between the nozzle 61 and the shaping surface 310 by moving the stage 300 with respect to the discharge unit 200. The moving mechanism 400 according to the present embodiment includes a three-axis positioner that moves the stage 300 in the three axis directions of the X, Y, and Z directions by driving forces of three motors. Each motor is driven under the control of the control unit 500. The moving mechanism 400 may be configured not to move the stage 300 but to move the discharge unit 200 without moving the stage 300 to change the relative position between the nozzle 61 and the shaping surface 310. In addition, the moving mechanism 400 may be configured to change the relative position between the nozzle 61 and the shaping surface 310 by moving both the stage 300 and the discharge unit 200.

The control unit 500 is composed of a computer including a processor, a storage unit, and an input/output interface for performing input and output of signals with the outside. In the present embodiment, the control unit 500 controls the operation of the discharge unit 200 and the moving mechanism 400 by the processor executing the program read into the storage unit to execute a three-dimensional shaping process for shaping a three-dimensional shaped object. Note that the control unit 500 may be composed of a combination of a plurality of circuits instead of a computer. The control unit 500 includes an operation unit 510 for receiving an operation from a user and a display unit 520 for displaying various kinds of information. The operation unit 510 and the display unit 520 may be integrally configured by a touch panel.

The discharge unit 200 includes a material supply unit 20 serving as a material supply source, a drive unit 35, a plasticizing unit 30 that plasticizes the material supplied from the material supply unit 20 into a plasticized material, the nozzle 61 having the nozzle hole 69 that discharges the plasticized material supplied from the plasticizing unit 30, a discharge adjustment unit 70 that adjusts the flow rate of the plasticized material supplied to the nozzle 61, a pressure sensor 80 that measures the pressure of the plasticized material, and a suction and delivery unit 90 that suctions and delivers the plasticized material. Here, "plasticizing" is a concept including melting and means changing from a solid state to a state having fluidity. Specifically, in the case of a material in which glass transition occurs, plasticization is to raise the temperature of the material to the glass transition point or higher. In the case of a material that does not undergo glass transition, plasticization refers to raising the temperature of the material to its melting point or higher.

The material supply unit 20 stores a material containing a thermoplastic resin in a state of pellets, powder, or the like. As the material, for example, a resin material such as PP (polypropylene) or POM (polyacetal) is used. The material supply unit 20 in the present embodiment is configured by a hopper. A supply path 22 that connects the material supply unit 20 and the plasticizing unit 30 is provided below the material supply unit 20. The material supply unit 20 supplies the material to the plasticizing unit 30 via the supply path 22.

In this embodiment, the drive unit 35 includes a drive motor 36. The drive motor 36 is fixed to the upper surface of a first case 31 described later. The rotation shaft of the drive motor 36 is connected to an upper surface 41 of a screw 40 described later. The drive motor 36 is driven under the control of the control unit 500 to rotate the screw 40. The drive unit 35 may include a speed reducer that reduces the number of rotations of the drive motor 36, and the drive motor 36 may be connected to the screw 40 via the speed reducer.

The plasticizing unit 30 includes the first case 31, a second case 32, a screw 40, and a barrel 50. The plasticizing unit 30 plasticizes at least part of the material in a solid state supplied from the material supply unit 20 into a paste-like plasticized material having fluidity and supplies the plasticized material to the nozzle 61.

The first case 31 is a housing for accommodating the screw 40. The second case 32 is a housing for accommodating the barrel 50. The screw 40 and the barrel 50 are accommodated in a space surrounded by the first case 31 and the second case 32.

The screw 40 has a substantially cylindrical shape in which the length in a direction along a central axis RX is smaller than the length in a direction perpendicular to the central axis RX. The screw 40 in the present embodiment is also called a flat screw. The screw 40 is disposed in the first case 31 such that the central axis RX is parallel to the Z direction. The screw 40 rotates about the central axis RX in the first case 31 by the torque generated by the drive motor 36. The screw 40 has a groove forming surface 42 in which a groove portion 45 is formed on a side opposite to the upper surface 41 in the direction along the central axis RX. A specific configuration of the screw 40 will be described later.

The barrel 50 is fixed in the second case 32. The barrel 50 has a screw facing surface 52 facing the groove forming surface 42 of the screw 40. The barrel 50 is provided with a flow path 56 having an opening portion at the center of the screw facing surface 52 and penetrating the barrel 50 along the Z direction and a first cross hole 57 and a second cross hole 92 extending along the Y direction so as to cross the flow path 56. The flow path 56 communicates with the nozzle hole 69, and a plasticized material flows therein. The flow path 56 is also referred to as a through hole. A specific configuration of the barrel 50 will be described later.

A heater 58 for heating the material supplied to the groove portion 45 of the screw 40 is embedded in the barrel 50. In the present embodiment, four rod-shaped heaters 58 are arranged along the Y direction. Each heater 58 is disposed below the screw facing surface 52. The temperature of each heater 58 is controlled by the control unit 500.

In the second case 32, a refrigerant pipe 59 through which the refrigerant flows is embedded around the barrel 50. The refrigerant pipe 59 is disposed so as to pass through the vicinity of the outer peripheral edge of the screw facing surface 52. The refrigerant pipe 59 is connected to a refrigerant pump 103. The refrigerant pump 103 supplies the refrigerant to the refrigerant pipe 59. The refrigerant pump 103 is driven under the control of the control unit 500. As the refrigerant, for example, a liquid such as water or oil, or a gas such as carbon dioxide can be used. It is possible to prevent the temperature of the screw 40 and the barrel 50 from becoming excessively high due to the refrigerant flowing through the refrigerant pipe 59. The refrigerant pipe 59 and the refrigerant pump 103 may be referred to as a cooling unit. The refrigerant pipe may be provided not only in the second case 32 but also in the first case 31.

The discharge adjustment unit 70 is provided in the flow path 56. The discharge adjustment unit 70 adjusts the discharge amount of the plasticized material from the nozzle hole 69 by adjusting the opening area of the flow path 56. The discharge adjustment unit 70 is configured by a valve. The discharge adjustment unit 70 is driven by a valve drive unit 101 and rotates in the flow path 56. The flow rate of the plasticized material supplied to the nozzle 61 is adjusted by the discharge adjustment unit 70 rotating in the flow path 56. The valve drive unit 101 is configured by an actuator such as a stepping motor and rotates the discharge adjustment unit 70 under the control of the control unit 500. In the flow path 56 formed in the barrel 50, a portion closer to the screw facing surface 52 than the discharge adjustment unit 70 is referred to as a first flow path 151, and a portion farther from the screw facing surface 52 than the discharge adjustment unit 70 is referred to as a second flow path 152. Hereinafter, when the first flow path 151 and the second flow path 152 are simply referred to, without distinction, as the flow path 56. A specific configuration of the discharge adjustment unit 70 will be described later.

The pressure sensor 80 is provided in the first flow path 151. The pressure sensor 80 measures the pressure of the plasticized material in first flow path 151. The value of the pressure of the plasticized material measured by the pressure sensor 80 is transmitted to the control unit 500.

The suction and delivery unit 90 is connected to the second flow path 152. The suction and delivery unit 90 suctions the plasticized material from the second flow path 152 and feeds the sucked plasticized material to the second flow path 152. A specific configuration of the suction and delivery unit 90 will be described later.

The nozzle 61 is attached to the lower surface of the second case 32. The nozzle 61 is provided with a nozzle flow path 68 and a nozzle hole 69. The nozzle flow path 68 is a flow path provided in the nozzle 61. The nozzle flow path 68 communicates with the second flow path 152 provided in the barrel 50. The nozzle hole 69 is a portion provided at an end portion of the nozzle flow path 68 on the side communicating with the atmosphere and having a reduced flow path cross section. The plasticized material flowing from the second flow path 152 into the nozzle flow path 68 is discharged from the nozzle hole 69. The flow rate of the plasticized material discharged from the nozzle hole 69 is adjusted by the discharge adjustment unit 70. The flow rate of the plasticized material discharged from the nozzle 61 is also referred to as the discharge amount.

Figure 2:
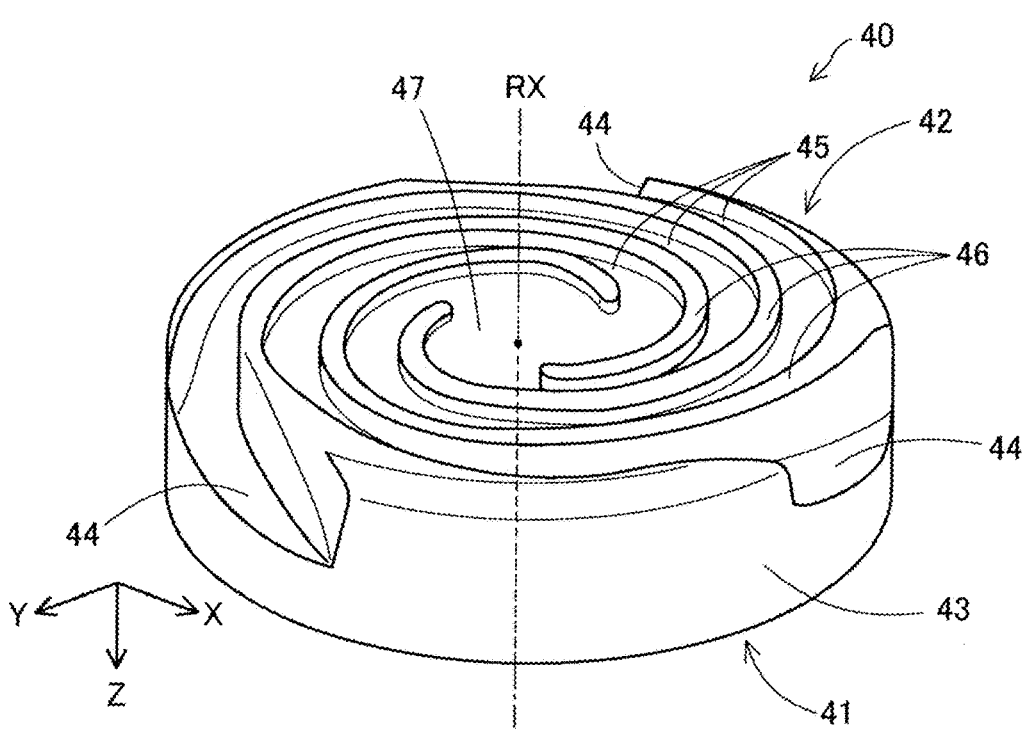
FIG. 2 is a schematic perspective view of a screw.

FIG. 2 is a schematic perspective view illustrating the configuration of the screw 40. Referring to FIG. 2, the position of the central axis RX of the screw 40 is indicated by the chain line. As described with reference to FIG. 1, the groove portion 45 is provided in the groove forming surface 42 of the moving mechanism 400.

A central portion 47 of the groove forming surface 42 of the screw 40 is configured as a recess to which one end of the groove portion 45 is connected. The central portion 47 faces the flow path 56 of the barrel 50 shown in FIG. 1. The central portion 47 intersects the central axis RX.

The groove portion 45 of the screw 40 forms a so-called scroll groove. The groove portion 45 spirally extends from the central portion 47 toward the outer periphery of the screw 40. The groove portion 45 is not limited to the spiral shape, but may be a vortex shape or an involute curve shape, or may be a shape extending so as to draw an arc from the central portion toward the outer periphery. The groove forming surface 42 is provided with a ridge portion 46 which forms a side wall portion of the groove portion 45 and extends along each groove portion 45.

The groove portion 45 continues to a material introduction port 44 formed in a side surface 43 of the screw 40. The material introduction port 44 is a portion that receives the material supplied via the supply path 22 of the material supply unit 20.

FIG. 2 shows an example of the screw 40 having three groove portions 45 and three ridge portions 46. The numbers of groove portions 45 and ridge portions 46 provided in the screw 40 are not limited to three. The screw 40 may be provided with only one groove portion 45 or may be provided with two or more groove portions 45. Further, an arbitrary number of ridge portions 46 may be provided in accordance with the number of groove portions 45.

FIG. 2 illustrates an example of the screw 40 in which material introduction ports 44 are formed at three locations. The number of material introduction ports 44 provided in the screw 40 is not limited to three. In the screw 40, the material introduction port 44 may be provided at only one location, or the material introduction ports 44 may be provided at two or more locations.

Figure 3:
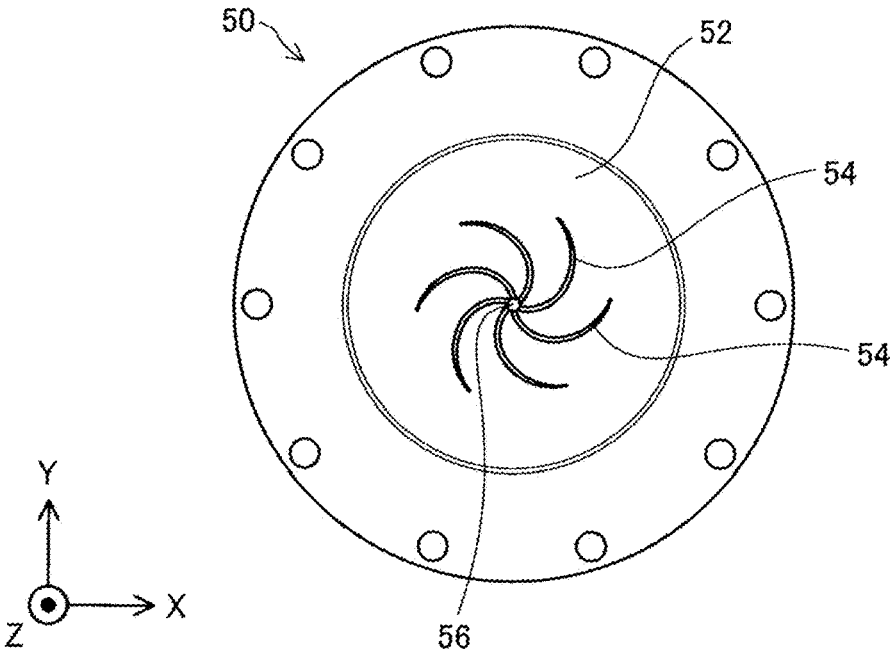
FIG. 3 is a top view of a barrel.

FIG. 3 is a top view illustrating the configuration of the barrel 50. As described above, the flow path 56 communicating with the nozzle 61 is formed at the center of the screw facing surface 52. A plurality of guide grooves 54 are formed around the flow path 56 in the screw facing surface 52. One end of each guide groove 54 is connected to the flow path 56, and the guide groove 54 spirally extends from the flow path 56 toward the outer periphery of the screw facing surface 52. Each guide groove 54 has a function of guiding a plasticized material to the flow path 56. One end of the guide groove 54 may not be connected to the flow path 56. Further, the guide groove 54 can be omitted.

In the following description, the space formed between the groove forming surface 42 of the screw 40 and the screw facing surface 52 of the barrel 50 is also a part of the flow path 56. A material or plasticized material passes through the flow path 56.

The suction and delivery unit 90 shown in FIG. 1 is formed by a plunger. The suction and delivery unit 90 is disposed in the second cross hole 92 communicating with the second flow path 152. The second cross hole 92 is also referred to as a cylinder. The suction and delivery unit 90 is slid in the second cross hole 92 by a plunger drive unit 102. The plunger drive unit 102 is driven under the control of the control unit 500. When the suction and delivery unit 90 moves in a direction away from the second flow path 152, the plasticized material in the second flow path 152 is drawn into the second cross hole 92. When the plasticized material in the second flow path 152 is drawn into the second cross hole 92, the plasticized material in the nozzle hole 69 is drawn into the second flow path 152. Therefore, when the discharge of the plasticized material from the nozzle hole 69 is stopped, it is possible to cut off the tail of the plasticized material discharged from the nozzle hole 69 by moving the suction and delivery unit 90 away from the second flow path 152. On the other hand, when the suction and delivery unit 90 moves in a direction approaching the second flow path 152, the plasticized material in the second cross hole 92 is pushed out from the second cross hole 92 to the second flow path 152. Therefore, when the discharge of the plasticized material from the nozzle hole 69 is resumed, the plasticized material in the second cross hole 92 is pushed out into the second flow path 152, so that the responsiveness of the discharge of the plasticized material from the nozzle hole 69 can be enhanced.

Figure 4:
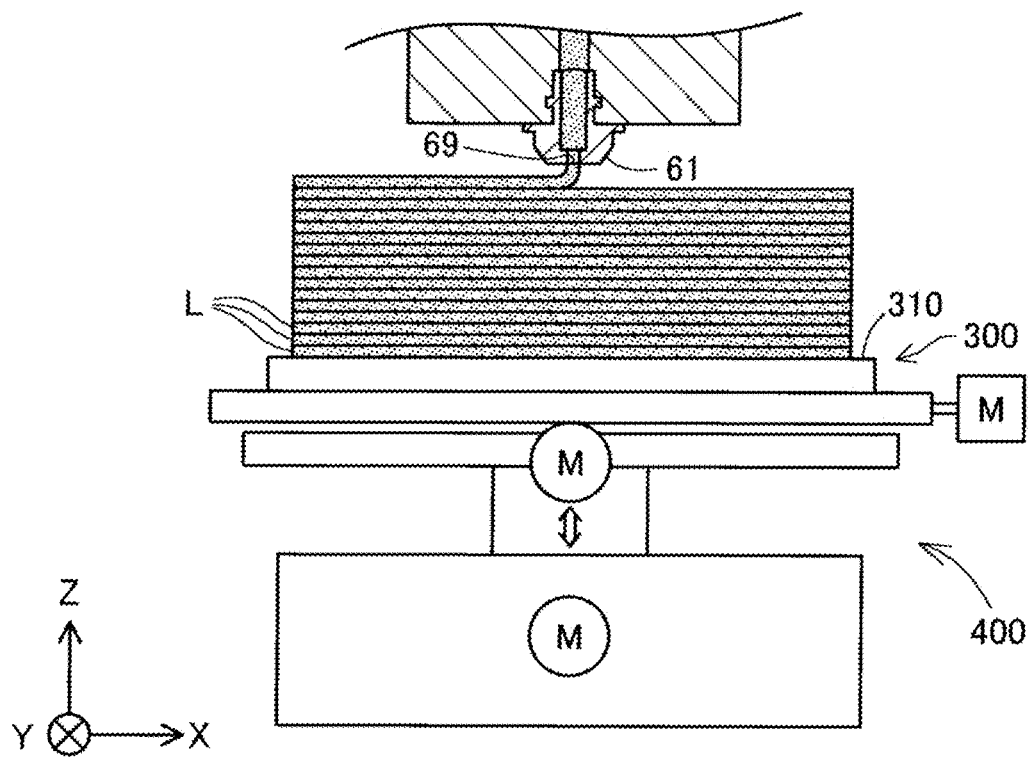
FIG. 4 is an illustrative diagram of a shaping process executed by a control unit.

FIG. 4 is an explanatory view of the shaping process executed by the control unit 500. In the three-dimensional shaping apparatus 100, as described above, the material in the solid state is plasticized to generate the plasticized material. The control unit 500 causes the nozzle 61 to discharge the plasticized material while changing the position of the nozzle 61 with respect to the stage 300 in a direction along the shaping surface 310 of the stage 300 while maintaining the distance between the shaping surface 310 of the stage 300 and the nozzle 61. The plasticized material discharged from the nozzle 61 is continuously deposited in the moving direction of the nozzle 61.

The control unit 500 repeats the movement of the nozzle 61 to form a layer L. After forming one layer L, the control unit 500 relatively moves the position of the nozzle 61 with respect to the stage 300 in the Z direction. Then, the three-dimensional shaped object is formed by further stacking a layer L on the layer L formed so far.

For example, the control unit 500 may temporarily suspend the movement of the nozzle 61 in the Z direction when one layer L is completed or the discharge of a plasticized material from the nozzle 61 when there are a plurality of independent shaping regions for each layer. In this case, the flow path 56 is closed by the discharge adjustment unit 70 to stop the discharge of the plasticized material from the nozzle hole 69, and the plasticized material in the nozzle 61 is temporarily sucked into the second cross hole 92 by the suction and delivery unit 90. After changing the position of the nozzle 61, the control unit 500 controls the suction and delivery unit 90 to discharge the plasticized material in the second cross hole 92 and causes the discharge adjustment unit 70 to open the flow path 56, thereby resuming the deposition of the plasticized material from the changed position of the nozzle 61.

Figure 5:
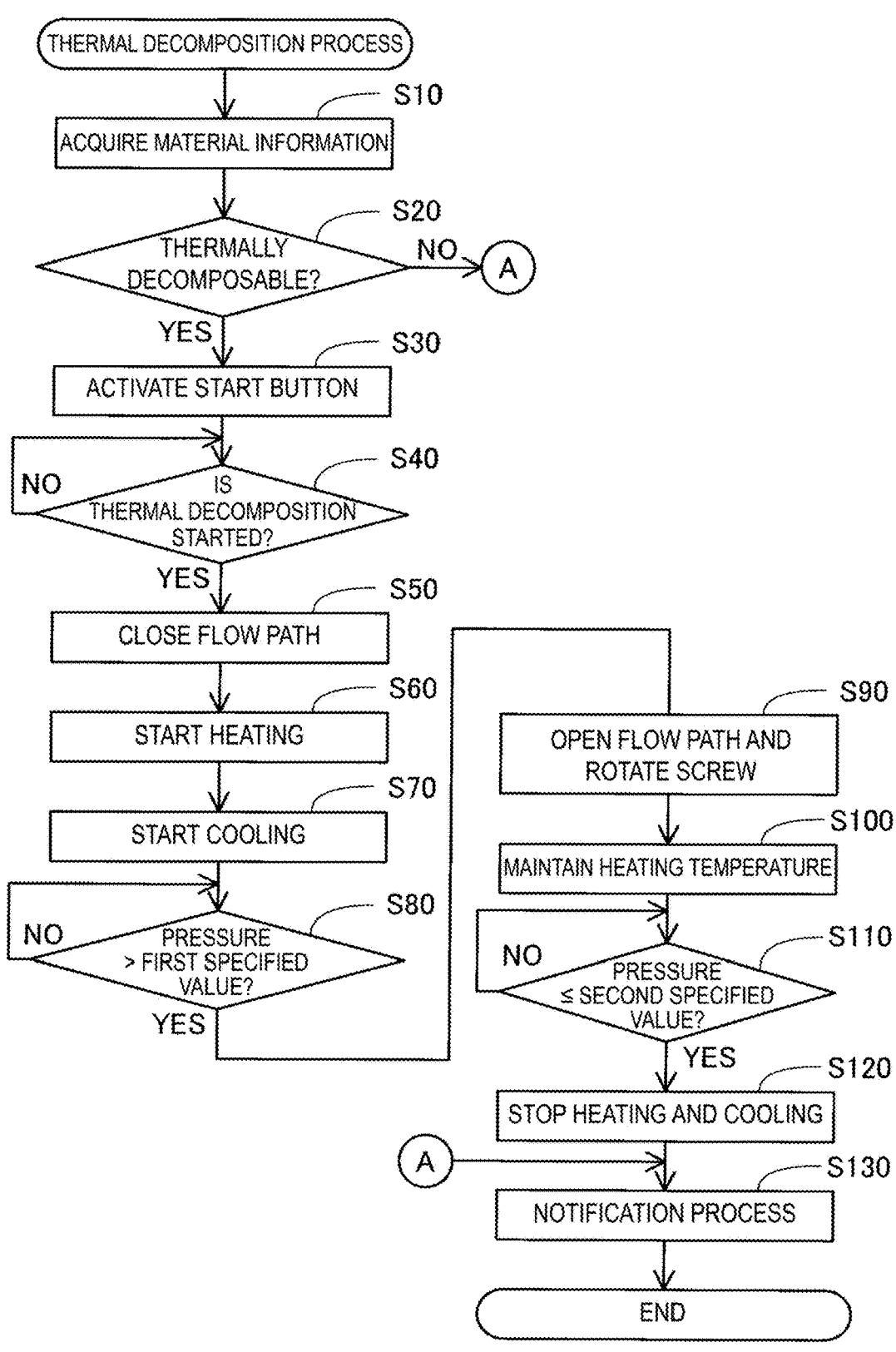
FIG. 5 is a flowchart of a thermal decomposition process.

FIG. 5 is a flowchart of the thermal decomposition process executed to implement the maintenance method for the discharge unit 200. The thermal decomposition process is a process for removing the material or the plasticized material remaining in the discharge unit 200 by thermal decomposition. This process is executed when there is a predetermined instruction from the user during a period in which a shaping process is not executed in the three-dimensional shaping apparatus 100. Hereinafter, when a material and a plasticized material are not distinguished from each other, they may be simply referred to as a material.

In step S10, the control unit 500 acquires the material information about the currently used material from the storage unit in the control unit 500. The storage unit stores a thermal decomposition temperature and a first specified value described later for each type of material. In step S10, the thermal decomposition temperature of the material currently in use and the first specified value corresponding to the material currently in use are acquired as material information. The thermal decomposition temperature is the temperature at which the material begins to lose weight. For example, if the material is POM, the thermal decomposition temperature is about 250° C. When a composite material obtained by mixing a plurality of types of materials is used as the material, the thermal decomposition temperature of the material having the lowest thermal decomposition temperature among the plurality of types of materials is the thermal decomposition temperature of the composite material.

In step S20, the control unit 500 determines whether or not the material currently in use is thermally decomposable. When the thermal decomposition temperature acquired in step S10 is lower than the maximum heating temperature of the heater 58, the control unit 500 determines that thermal decomposition is possible. The maximum heating temperature of the heater 58 is equal to or lower than the durable temperature of the nozzle 61 and is, for example, 400° C. When the thermal decomposition temperature of the material is higher than the maximum heating temperature of the heater 58, the control unit 500 shifts the process to step S130. In step S130, the control unit 500 displays that the material cannot be thermally decomposed, and ends the thermal decomposition process. The control unit 500 may control a sound output device or a light emitting device to notify, by sound or light, that the material cannot be thermally decomposed.

If it is determined in step S20 that thermal decomposition is possible, the control unit 500 activates a thermal decomposition start button as an operation unit displayed on the display unit 520 in step S30. In the present embodiment, to "activate" means to enable the operation unit that has been inoperable until then to perform an operation or to enable the operation unit to respond to an operation performed on the operation unit. For example, the control unit 500 activates the thermal decomposition start button that has been grayed out and cannot be pressed by canceling the graying out and allowing the button to be pressed. In another embodiment, the activation may be performed by displaying the thermal decomposition start button that has not been displayed. Note that the operation unit is not limited to virtual buttons displayed on the display unit 520 and may be constituted by physical buttons, levers, and switches.

In step S40, the control unit 500 determines whether or not to start thermal decomposition. The control unit 500 determines to start thermal decomposition upon determining that the user has pressed the thermal decomposition start button using the operation unit 510. Upon determining not to start thermal decomposition, the control unit 500 repeats the determination processing in step S40.

Upon determining in step S40 to start thermal decomposition, the control unit 500 controls the discharge adjustment unit 70 to close the flow path 56 by setting the opening area of the flow path 56 to 0 in step S50.

In step S60, the control unit 500 controls the heater 58 to start heating and sets the heating temperature of the heater 58 to a temperature equal to or higher than the thermal decomposition temperature of the material. The process from step S60 to step S110 described later is also referred to as a heating process.

In step S70, the control unit 500 controls the refrigerant pump 103 to start cooling the discharge unit 200. The processing order of step S60 and step S70 may be reversed, or step S60 and step S70 may be executed simultaneously.

In step S80, the control unit 500 detects the internal pressure of the first flow path 151 using the pressure sensor 80 and determines whether or not the internal pressure exceeds the first specified value acquired in step S10.

Figure 6:
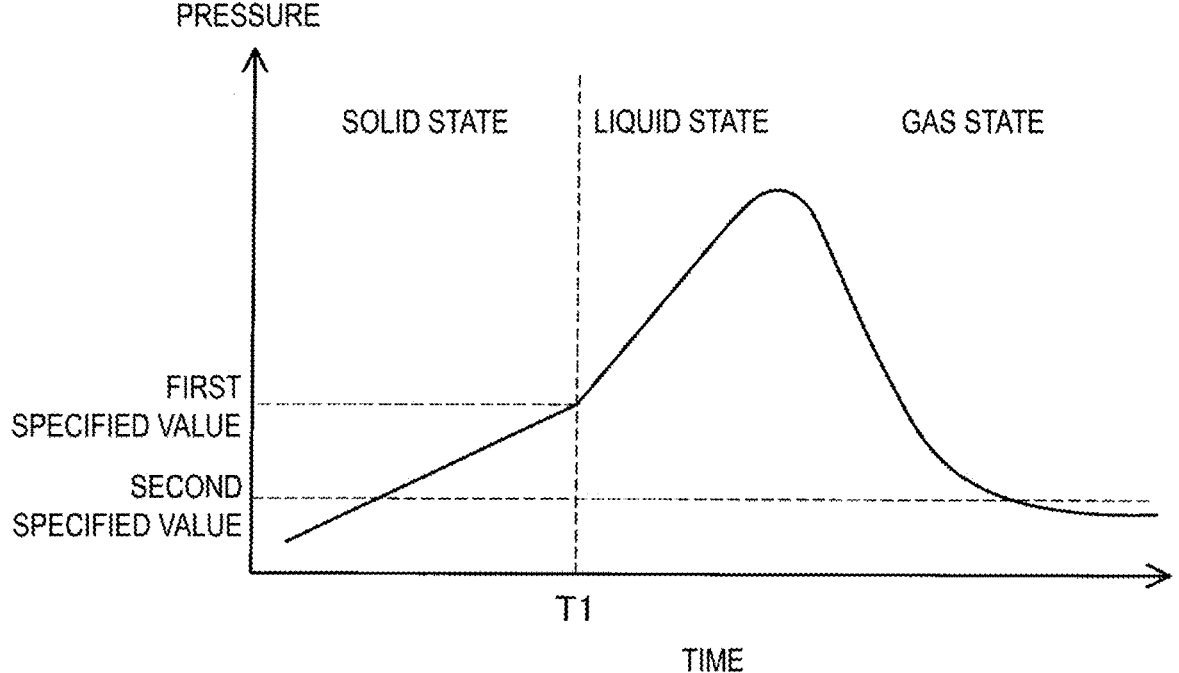
FIG. 6 is an illustrative diagram illustrating an example of the relationship between the lapse of time and the pressure in a thermal decomposition process.

FIG. 6 is an explanatory diagram showing an example of the relationship between the time course of the thermal decomposition process and the pressure. The material in the solid state thermally expands due to heating by the heater 58, and the pressure detected by the pressure sensor 80 gradually increases. When the temperature of the material exceeds the melting point or the glass transition point, the material becomes a liquid state or a rubber state. The first specified value is determined for each material as the value of the pressure at the time when the material changes from a solid state to a liquid state or a rubber state. The first specified value is, for example, 1 M to 2 MPa.

Upon determining in step S80 that the pressure in the first flow path 151 exceeds the first specified value, the control unit 500 controls the discharge adjustment unit 70 to maximize the opening area of the flow path 56 and opens the flow path 56 in step S90. Then, in step S90, the control unit 500 starts the rotation of the screw 40. Upon determining in step S80 that the pressure in the first flow path 151 does not exceed the first specified value, the control unit 500 repeats the processing in step S80 until the pressure in the first flow path 151 exceeds the first specified value. The process from step S90 to step S110 described later is also referred to as a releasing process. When the flow path 56 is opened in step S90, the material thermally decomposed by heating by the heater 58 or the plasticized material is released to the outside of the discharge unit 200.

In step S100, the control unit 500 maintains the heating temperature of the heater 58 at a temperature equal to or higher than the thermal decomposition temperature. As shown in FIG. 6, after the flow path 56 is opened at time T1, the material is heated at a temperature equal to or higher than the thermal decomposition temperature to be in a liquid state and then transitions to a gas state. The time from the start of heating by the heater 58 until the material reaches the thermal decomposition temperature is, for example, 10 minutes to 15 minutes, and the time from the start of vaporization by thermal decomposition is, for example, 10 minutes to 15 minutes.

In step S110, the control unit 500 detects the pressure in the flow path 56 using the pressure sensor 80 and determines whether or not the pressure is equal to or less than a predetermined second specified value. In the present embodiment, the second specified value is set to a value smaller than the first specified value and slightly higher than the atmospheric pressure. When the material is heated to be in a liquid state, the pressure increases. Thereafter, when the material is thermally decomposed to be in a gas state, the vaporized material is released from the nozzle hole 69, and thus the value of the pressure detected by the pressure sensor 80 gradually decreases to be substantially the same as the pressure of the atmospheric pressure. Therefore, by setting the second specified value to a value slightly higher than the atmospheric pressure, it can be determined that the thermal decomposition of the material is completed. The control unit 500 repeats the processing of step S110 until the pressure becomes equal to or less than the second specified value.

Upon determining in step S110 that the pressure detected using the pressure sensor 80 has become equal to or lower than the second specified value, the control unit 500 stops heating by the heater 58 and cooling by the refrigerant and further stops the rotation of the screw 40 in step S120. Then, in step S130, the control unit 500 displays, on the display unit 520, that the thermal decomposition process is completed. Note that the control unit 500 may control the sound output device or the light emitting device to notify, by sound or light, that the thermal decomposition process is completed.

According to the first embodiment described above, the material or the plasticized material present in the flow path 56 of the discharge unit 200 can be heated at a temperature equal to or higher than the thermal decomposition temperature of the material or the plasticized material, and the thermally decomposed material or plasticized material can be discharged from the flow path 56. Therefore, the material or the plasticized material in the discharge unit 200 can be quickly removed. As a result, maintenance processing such as the replacement or cleaning of the material can be efficiently performed.

In addition, in the present embodiment, heating for thermal decomposition is performed in a state in which at least a part of the portion of the discharge unit 200 excluding the flow path 56 is cooled using the refrigerant pipe 59. Therefore, it is possible to suppress excessive heating of the portion of the discharge unit 200 excluding the flow path 56. As a result, it is possible to suppress the deterioration of the drive motor 36 and a resin component such as a seal member provided in the discharge unit 200 due to the influence of heat.

In the present embodiment, the heater 58 provided in the plasticizing unit 30 is used for the thermal decomposition of the material or the plasticized material. Therefore, it is not necessary to install a separate heater in order to thermally decompose the material or the plasticized material. When the thermally decomposed material or plasticized material is discharged, the screw 40 provided in the plasticizing unit 30 is rotated. Therefore, the material or the plasticized material can be rapidly discharged from the discharge unit 200.

In the present embodiment, in the processing from step S50 to step S80 described above, the pressure in the flow path 56 is detected, and the flow path 56 is closed using the discharge adjustment unit 70 until the detected pressure reaches the first specified value from a value lower than the first specified value. Then, when the detected pressure exceeds the first specified value, the flow path 56 is opened using the discharge adjustment unit 70 in step S90. Therefore, since the thermally decomposed material or the plasticized material can be released at once when the pressure reaches the first specified value, the possibility that a foreign matter and the like present in the flow path 56, in particular, on the downstream side of the discharge adjustment unit 70 can be removed increases. When the discharge adjustment unit 70 is fixed by the cured material at the start of the execution of thermal decomposition process, the flow path 56 can be opened by the discharge adjustment unit 70 after the fixing is released by the progress of heating. Therefore, it is possible to prevent the discharge adjustment unit 70 from being forcibly driven in a fixed state. Furthermore, in the present embodiment, since the rotation of the screw 40 is started at the timing at which the heating progresses and the flow path 56 is opened, it is possible to suppress the screw 40 from being forcibly driven in a fixed state.

Further, in the present embodiment, after the flow path 56 is opened in step S90, the heating temperature is maintained in step S100 in a state where the flow path 56 is opened. Therefore, the thermal decomposition of the material or the plasticized material can be accelerated, thereby increasing the possibility that the thermally decomposed material or the plasticized material is completely released.

In addition, in the present embodiment, the pressure in the flow path 56 is detected, and, in a case where the pressure decreases from a value exceeding the second specified value to a value equal to or less than the second specified value in step S110 described above, the completion of the thermal decomposition is notified in step S120. Therefore, it is possible to notify the user that the thermal decomposition process is completed.

In addition, in the present embodiment, the material information about the material is acquired from the storage unit in step S10, and it is determined whether or not the material can be thermally decomposed based on the material information in step S20. Therefore, it is possible to prevent the heating process from being performed on a material or a plasticized material having a thermal decomposition temperature exceeding the heating capability of the heater 58.

In addition, in the present embodiment, the operation unit 510 for executing the heating process is activated in step S30. Therefore, it is possible to prevent a material that cannot be thermally decomposed from being heated by an erroneous operation of the user.

B. Second Embodiment

Figure 7:
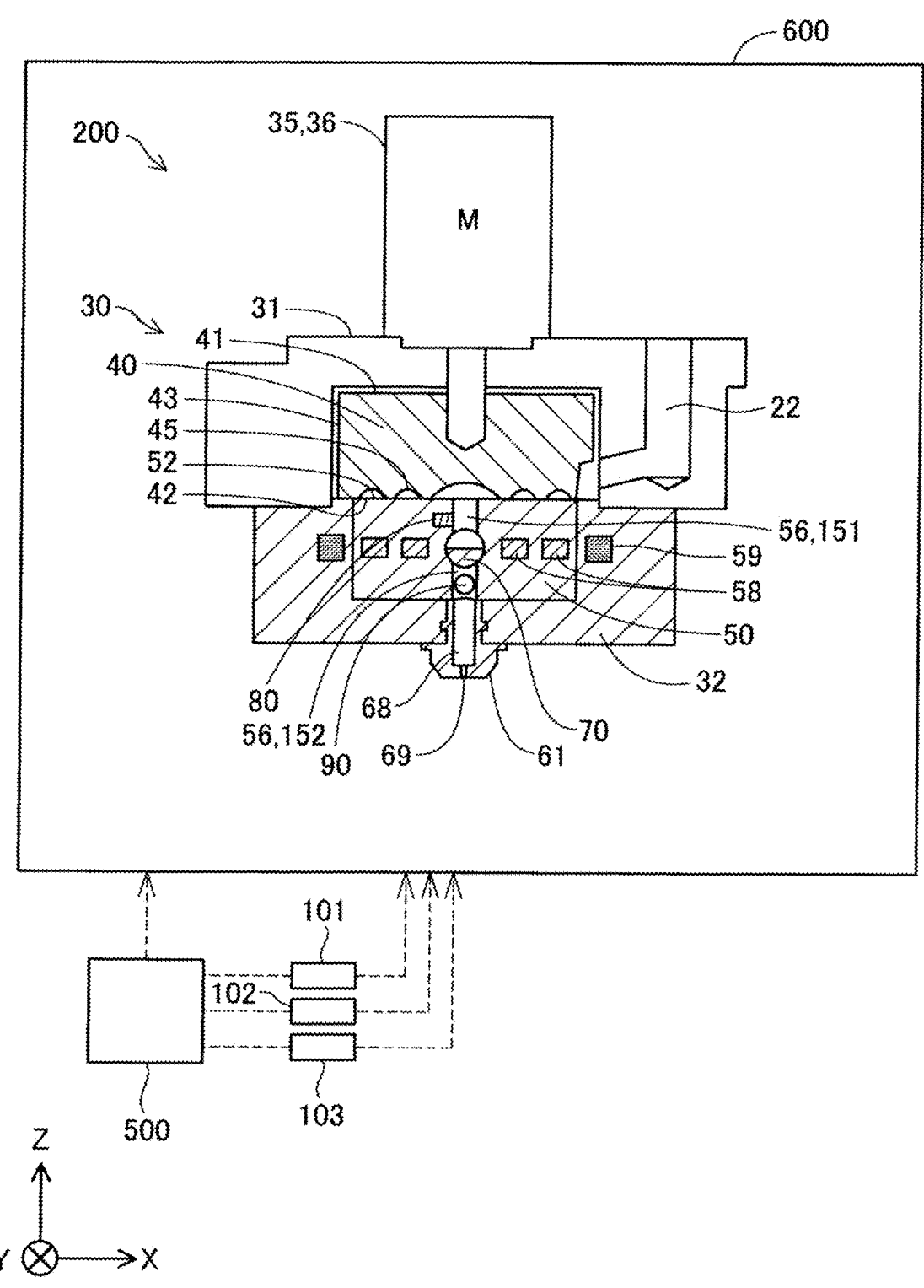
FIG. 7 is a diagram illustrating the schematic configuration of a discharge unit according to the second embodiment.

FIG. 7 is a diagram illustrating the schematic configuration of a discharge unit 200 according to the second embodiment. In the second embodiment, the discharge unit 200 is configured to be detachable from a three-dimensional shaping apparatus 100.

In the second embodiment, the discharge unit 200 is removed from the three-dimensional shaping apparatus 100 and installed in a chamber 600. Although FIG. 7 illustrates a state in which a material supply unit 20 is detached from the discharge unit 200, the material supply unit 20 may be attached to the discharge unit 200. The chamber 600 is a heating chamber provided separately from the three-dimensional shaping apparatus 100. The chamber 600 has, for example, a heating space surrounded by a heat insulating member. The discharge unit 200 in the chamber 600 is connected to a control unit 500 installed outside the chamber 600, a valve drive unit 101, a plunger drive unit 102, and a refrigerant pump 103. When the thermal decomposition process shown in FIG. 5 is executed by the control unit 500, thermal decomposition of the material or the plasticized material is performed in the chamber 600. The chamber 600 may be provided with an exhaust device for discharging the thermally decomposed material or plasticized material to the outside of the chamber 600.

According to the second embodiment described above, since the material or the plasticized material can be removed in a state where the discharge unit 200 is detached from the three-dimensional shaping apparatus 100, it is possible to improve the maintainability of the discharge unit 200.

In addition, in the present embodiment, since the refrigerant pump 103 is connected to the discharge unit 200 installed in the chamber 600, it is possible to thermally decompose the material or the plasticized material in a state where at least a part of the portion of the discharge unit 200 excluding the flow path 56 is cooled. As a result, it is possible to suppress the deterioration of a drive motor 36 and a resin component such as a seal member provided in the discharge unit 200 due to the influence of heat.

C. Other Embodiments (C1) In the above embodiment, the thermal decomposition process is performed while the discharge unit 200 is cooled using the refrigerant pump 103 and the refrigerant pipe 59. On the other hand, depending on the heat resistance performance of the discharge unit 200, it is also possible to perform a thermal decomposition process without performing cooling.

(C2) In the above embodiment, heating for thermal decomposition is performed by the heater 58 provided in the plasticizing unit 30. On the other hand, thermal decomposition may be performed using a heater provided outside the discharge unit 200. In the above embodiment, the release of the thermally decomposed material or plasticized material is promoted by rotating the screw 40 provided in the plasticizing unit 30. In contrast, the release of the thermally decomposed or plasticized material may be performed without rotating the screw 40.

(C3) In the thermal decomposition process of the above-described embodiment, the flow path 56 is closed until the internal pressure of the flow path 56 reaches the first specified value after the start of heating, and the flow path 56 is opened when the internal pressure exceeds the first specified value. On the other hand, a heating treatment may be started in a state where the flow path 56 is opened.

(C4) In the thermal decomposition process of the above-described embodiment, the flow path 56 is opened and the heating temperature is maintained after the internal pressure of the flow path 56 reaches the first specified value. On the other hand, in a state in which a thermal decomposition process has sufficiently progressed at the time point when the internal pressure of the flow path 56 reaches the first specified value, the process of maintaining the heating temperature may be omitted. That is, the process of step S100 shown in FIG. 5 can be omitted.

(C5) In the above-described embodiment, when the internal pressure of the flow path 56 becomes equal to or lower than the second specified value, the completion of the thermal decomposition is notified. On the other hand, this processing may be omitted. That is, the process of step S130 shown in FIG. 5 may be omitted.

(C6) In the above-described embodiment, material information is acquired from the storage unit and it is determined whether or not the material can be thermally decomposed. On the other hand, these processes may be omitted. That is, the processes of step S10 and step S20 shown in FIG. 5 can be omitted.

(C7) In the above-described embodiment, when it is determined that the material can be thermally decomposed, the operation unit 510 for performing heating is enabled. In contrast to this, the operation unit 510 may be always enabled. That is, the process of step S30 shown in FIG. 5 can be omitted.

(C8) In the above-described embodiment, the first specified value corresponding to the type of material is used in step S80 of the thermal decomposition process shown in FIG. 5. In contrast to this, a value common to each material may be used as the first specified value.

(C9) In the above-described embodiment, the plasticizing unit 30 plasticizes the material by the flat screw. In contrast to this, the plasticizing unit 30 may plasticize the material by, for example, rotating an in-line screw. In addition, the plasticizing unit 30 may plasticize a filament-shaped material with a heater.

(C10) The discharge unit 200 according to the above-described embodiment is not limited to the three-dimensional shaping apparatus 100 and may be provided in an injection-molding machine. In this case, the above-described thermal decomposition process may be performed with respect to the discharge unit 200 provided in the injection molding machine.

Other Aspects

The present disclosure is not limited to the embodiments described above and can be realized in various configurations without departing from the gist of the disclosure. For example, appropriate replacements or combinations may be made to the technical features of the embodiments which correspond to the technical features in the aspects described below to solve some or all of the problems described above or to achieve some or all of the advantageous effects described above. Further, when the technical characteristics are not described as being essential in the present specification, the technical characteristics can be deleted as appropriate.

(1) According to a first aspect of the present disclosure, there is provided a maintenance method for a discharge unit which has a nozzle hole and plasticizes a material containing a thermoplastic resin to generate a plasticized material. The maintenance method includes a heating step of heating the material or the plasticized material present in the flow path which communicates with the nozzle hole and through which the material or the plasticized material passes at a temperature equal to or higher than the thermal decomposition temperature of the material or the plasticized material, and a releasing step of releasing the material or the plasticized material thermally decomposed in the heating step from the flow path.

According to this aspect, by thermally decomposing the material or the plasticized material, it is possible to rapidly remove the material or the plasticized material in the discharge unit.

(2) In the aspect described above, the heating process may be performed in a state in which at least a part of a portion of the discharge unit excluding the flow path is cooled. According to this aspect, it is possible to suppress excessive heating of a portion of the discharge unit excluding the flow path.

(3) In the aspect described above, the discharge unit may include a plasticizing unit that plasticizes the material, the plasticizing unit may include a screw that is rotated by a drive motor and has a groove forming surface in which a groove is formed, and a heater, and the heater may heat the material or the plasticized material in the heating process, and the screw may be rotated in the releasing process. According to such an aspect, the material or the plasticized material can be thermally decomposed using the heater provided in the plasticizing unit, and the thermally decomposed material or plasticized material can be rapidly released by rotating the screw provided in the plasticizing unit.

(4) In the above embodiment, the discharge unit may include a discharge adjustment unit that is disposed in the flow path and adjusts the opening area of the flow path, and the method may include a process of closing the flow path using the discharge adjustment unit until the pressure in the flow path reaches the first specified value from a value lower than the first specified value, and a process of opening the flow path using the discharge adjustment unit when the pressure exceeds the first specified value. According to such a form, since the thermally decomposed material or plasticized material can be released at once when the pressure reaches the first specified value, there is an increased possibility that foreign matters and the like in the flow path can be removed. When the discharge adjustment unit is fixed by a cured material, the flow path can be opened by operating the discharge adjustment unit after the fixing is canceled by the progress of heating.

(5) In the above aspect, the method may include a process of maintaining the temperature in a state where the flow path is opened after the flow path is opened. According to such an embodiment, the thermal decomposition of the material or the plasticized material can be promoted.

(6) In the above embodiment, the method may include a process of notifying that the thermal decomposition is completed when the pressure in the flow path decreases from a value exceeding the second specified value to a value equal to or less than the second specified value. According to such a form, it is possible to notify the user that the thermal decomposition is completed.

(7) In the above aspect, the method may include a process of acquiring material information about the material from a storage unit and a process of determining based on the material information whether or not thermal decomposition of the material is possible. According to such an aspect, it is possible to suppress the execution of the heating process for a material that cannot be thermally decomposed.

(8) In the above aspect, the method may include a process of enabling the operation unit for executing the heating process when it is determined that the thermal decomposition of the material is possible. According to such an aspect, erroneous operation of the operation unit by the user can be suppressed.

(9) In the aspect described above, the discharge unit may be detachably attached to the three-dimensional shaping apparatus, and the heating process and the releasing process may be performed in a state where the discharge unit is detached from the three-dimensional shaping apparatus and installed in the chamber. According to this aspect, the material or the plasticized material can be removed in a state in which the discharge unit is detached from the three-dimensional shaping apparatus.

(10) In the aspect described above, the heating process may be performed in a state in which at least a part of a portion of the discharge unit installed in the chamber excluding the flow path is cooled. According to this aspect, it is possible to suppress excessive heating of a portion of the discharge unit excluding the flow path.

The present disclosure is not limited to the above-described maintenance method for the discharge unit and can be realized by various aspects such as a three-dimensional shaping apparatus, a computer program, and a non-transitory tangible recording medium in which the computer program is recorded in a computer readable manner.

What is claimed is:

1. A maintenance method for a discharge unit, the discharge unit including a nozzle hole and being configured to generate a plasticized material by plasticizing a material containing a thermoplastic resin, the method comprising:

heating the material or the plasticized material present in a flow path communicating with the nozzle hole and through which the material or the plasticized material passes, at a temperature not less than a thermal decomposition temperature of the material or the plasticized material, the discharge unit includes a discharge adjustment unit disposed in the flow path and configured to adjust the opening area of the flow path; and releasing, from the flow path, the material or the plasticized material thermally decomposed in the heating by closing the flow path using the discharge adjustment unit until a pressure in the flow path reaches a first specified value from a value lower than the first specified value; and opening the flow path using the discharge adjustment unit when the pressure exceeds the first specified value.

2. The maintenance method according to claim 1, wherein the heating is performed in a state where at least a part of a portion of the discharge unit excluding the flow path is cooled.

3. The maintenance method according to claim 1, wherein the discharge unit includes a plasticizing unit configured to plasticize the material, the plasticizing unit includes a screw rotated by a drive motor and including a groove forming surface formed with a groove, and heater, and the heater heats the material or the plasticized material in the heating, and the screw is rotated in the releasing.

4. The maintenance method according to claim 1, comprising maintaining the temperature in a state where the flow path is opened, after the flow path is opened.

5. The maintenance method according to claim 1, comprising notifying that the thermal decomposition is completed when the pressure in the flow path decreases from a value exceeding a second specified value to a value not greater than the second specified value.

6. The maintenance method according to claim 1, comprising:

acquiring material information about the material from a storage unit; and determining based on the material information whether or not thermal decomposition of the material is possible.

7. The maintenance method according to claim 6, comprising activating an operation unit for executing the heating when it is determined that thermal decomposition of the material is possible.

8. The maintenance method according to claim 1, wherein the discharge unit is detachably attached to a three-dimensional shaping apparatus, and the heating and the releasing are performed in a state where the discharge unit is detached from the three-dimensional shaping apparatus and installed in a chamber.

9. The maintenance method according to claim 8, wherein the heating is performed in a state where at least a part of a portion of the discharge unit installed in the chamber, excluding the flow path, is cooled.

* * * * *